United States Patent [19]

Cleaves

[11] 4,032,087
[45] June 28, 1977

[54] AIRCRAFT SPOILER SYSTEM

[76] Inventor: Prentiss B. Cleaves, 4542 Norma Drive, San Diego, Calif. 92115

[22] Filed: June 3, 1976

[21] Appl. No.: 692,360

Related U.S. Application Data

[63] Continuation of Ser. No. 550,354, Feb. 18, 1975, abandoned.

[52] U.S. Cl. ............................... 244/214; 244/113
[51] Int. Cl.² ......................................... B64C 3/58
[58] Field of Search ............... 244/40 R, 41, 42 R, 244/42 CA, 42 D, 42 DA, 113; 74/126

[56] References Cited

UNITED STATES PATENTS

| | | | |
|---|---|---|---|
| 1,815,489 | 7/1931 | Albers et al. | 244/42 D |
| 1,831,780 | 11/1931 | Sharp | 244/40 R |
| 2,410,855 | 11/1946 | Koppen | 244/42 D |
| 2,453,403 | 11/1948 | Bogardus | 244/40 R |
| 2,466,426 | 4/1949 | Hoover | 244/42 D |
| 2,552,073 | 5/1951 | Tindall | 244/42 R |
| 2,649,265 | 8/1953 | Grant | 244/40 R |
| 2,763,793 | 9/1956 | Krasney | 74/126 |
| 2,809,736 | 10/1957 | Hoover | 244/42 D |

Primary Examiner—Trygve M. Blix
Assistant Examiner—Galen L. Barefoot
Attorney, Agent, or Firm—Brown & Martin

[57] ABSTRACT

An aircraft spoiler system consisting of semi-circular rods disposed within the leading edge of an aircraft wing and rotatably carried thereby so that in the inactive position the substantially flat surfaces are flush with the wing surface and in its most active position the flat surfaces are at right angles to the wing surface with approximately half of the rods extending above the wing surface, acting in a manner to eliminate the lift of the wing, i.e., as spoilers. The rods are controlled by a pair of magnetic clutches which connect the spoiler rods to a rotary solenoid when a toggle switch is thrown by the pilot. The spoilers have mechanical spring returns which automatically retract them when the switch is in its "off" position or in the event of a power failure. A retro-fit mounting is provided for fitting the spoilers on existing wing section.

3 Claims, 10 Drawing Figures

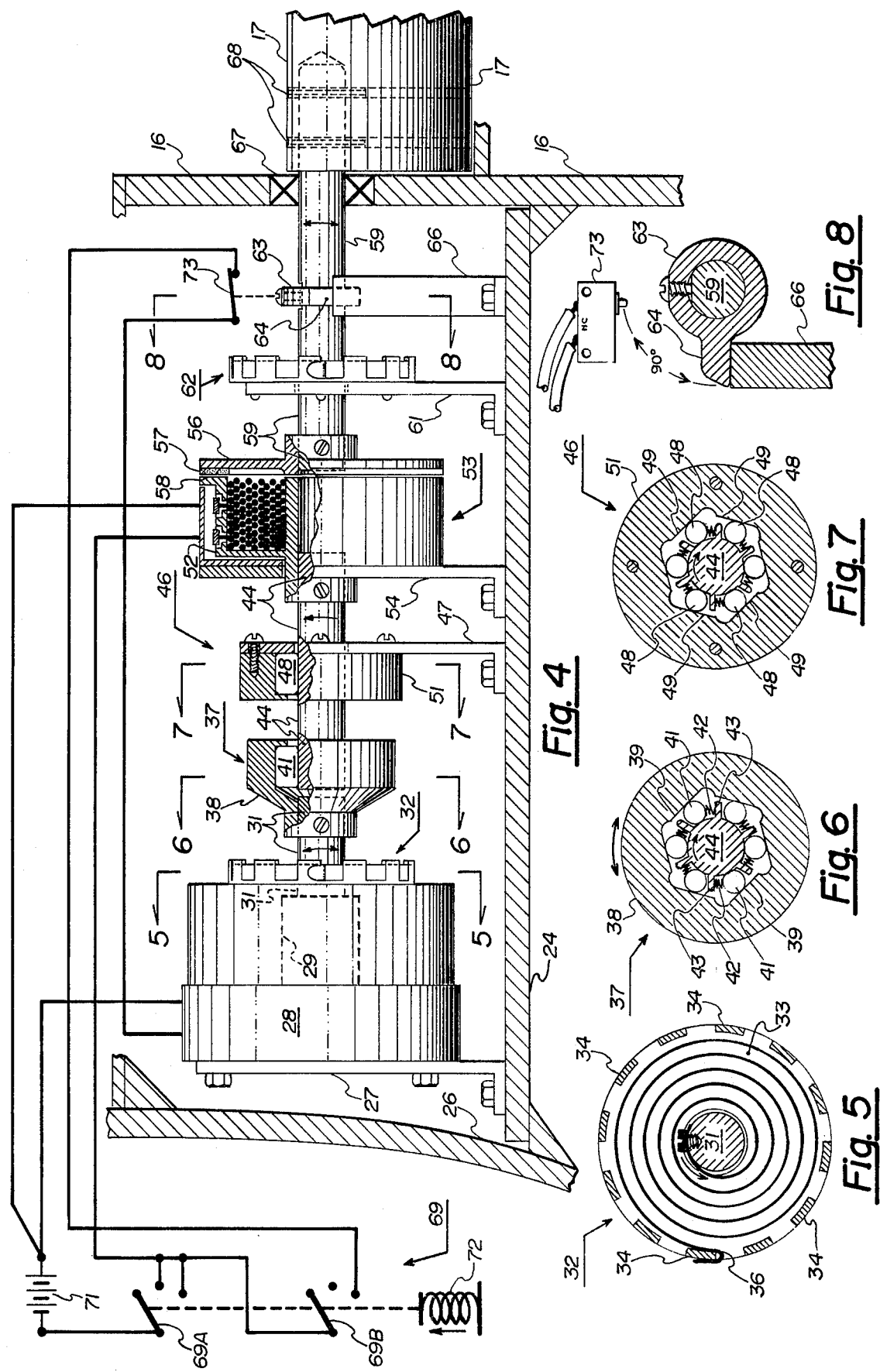

AIRCRAFT SPOILER SYSTEM

RELATED APPLICATIONS

This application is a continuation of an application filed on Feb. 18, 1975, Ser. No. 550,354, Group 315, by PRENTISS B. CLEAVES for AIRCRAFT SPOILER SYSTEM, now abandoned.

BRIEF DESCRIPTION OF THE INVENTION

The present invention relates to an aircraft spoiler system, and more particularly to an aircraft spoiler system having a fail-safe control mechanism and retrofitted mounting.

The utilization of hemispherical rods as aircraft spoilers has been known for some time and was developed in its early stages in a system for spoiling windmill blades, although the same theory applies to aircraft wing spoiling. The early system was described in U.S. Pat. No. 1,815,489, issued on July 21, 1931, to Albers, et al, for Air Foil Lift Control. Since the theory is identical, it will not be further detailed.

According to the invention, a hemispherical rod spoiler system is provided for mounting to each side of an aircraft wing toward the leading edge thereof. In its inoperative position, the surfaces are flush with the surface of the wing, the exposed surfaces being the substantially flat side of the spoiler rods. In its fully actuated position, the spoilers are rotated so that the flat surface is substantially perpendicular to the wing surface which effects a substantial removal of the lift of that wing. A unique control system is provided whereby a pair of magnetic clutches connect the spoilers to a rotary solenoid actuator whenever the operating circuit is closed. When the operating circuit is opened, mechanical spring return mechanisms retract the spoilers to their flush position which operates as a fail-safe mechanism in the case of power failure. A toggle-type actuator switch located in proximity to the pilot of the aircraft has a three-way action, one of which being "off," at which point the spoilers are retracted; another is an "actuate" position which rotates the spoilers through one arcuate step each time the actuate position is maintained; and a "hold" position which holds the spoilers in an extended position that has been selected by the pilot. A retro-fit mounting means is provided for mounting the spoilers to existing aircraft wings.

An object of the present invention is the provision of an improved aircraft spoiler system.

Another object of the invention is the provision of an aircraft spoiler system having a retro-fit mounting means.

A further object of the invention is the provision of an aircraft spoiler system having a unique fail-safe control mechanism.

Yet another object of the invention is the provision of an aircraft spoiler system which is extremely simple and convenient in operation.

Other objects and many of the attendant advantages of the present invention will be readily appreciated as the same becomes better understood by reference to the following detailed description when considered in connection with the accompanying drawings in which like reference numerals designate like parts throughout the Figures thereof and wherein:

FIG. 4 is a side elevational view partially broken away of the preferred embodiment of the present invention with the control circuitry in schematic form;

FIG. 5 is a cross-sectional view taken along lines 5—5 of FIG. 4;

FIG. 6 is a cross-sectional view taken along lines 6—6 of FIG. 4;

FIG. 7 is a cross-sectional view taken along lines 7—7 of FIG. 4;

FIG. 8 is a cross-sectional view taken along lines 8—8 of FIG. 4;

DETAILED DESCRIPTION OF THE DRAWING

Figure 1:
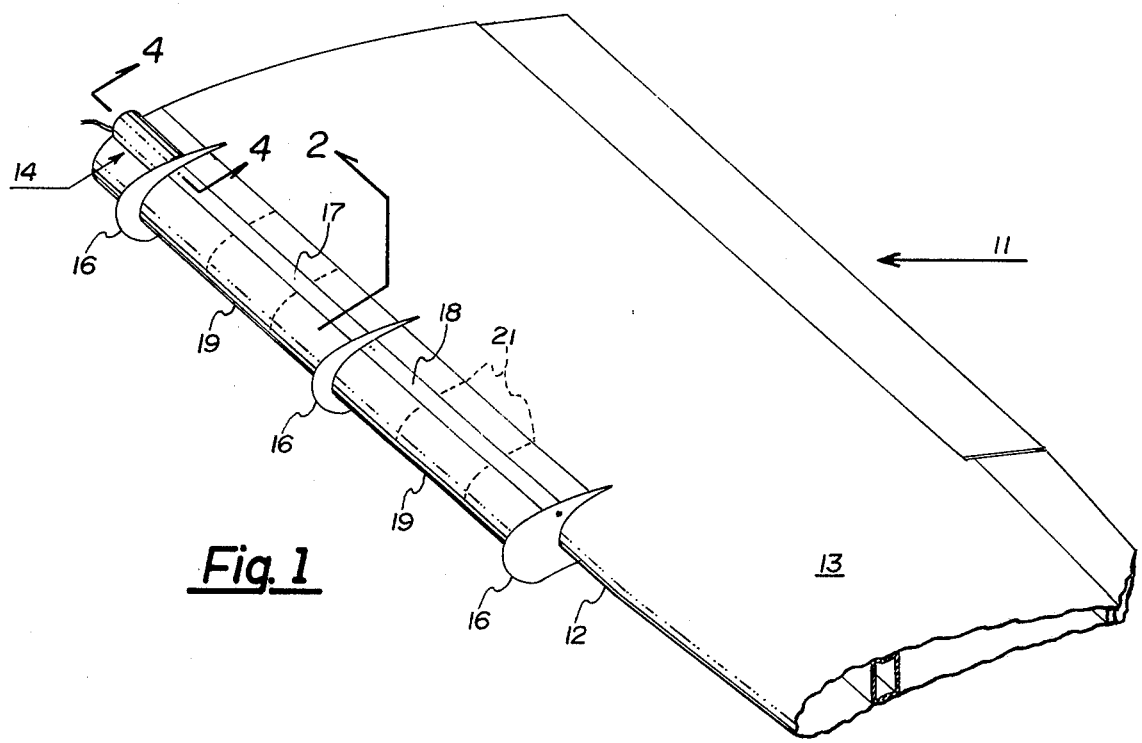
FIG. 1 is a perspective view of a wing section illustrating the third embodiment of the invention in situ.

Referring to FIG. 1, the spoiler and the retro-fit mounting of the present invention is shown generally at 11 attached to a leading edge 12 of an aircraft wing 13. An electro-mechanical actuator 14 has a shaft (not shown) which passes through an air fence/spoiler bearing support 16 and is attached with drive pins (not shown) as a contiguous part of an inboard spoiler rod 17, with an aproximately half-circle cross section equipped at the outer end with an outer shaft (not shown) which passes through a second air fence/spoiler bearing support 16, and is contiguous with an outboard spoiler rod 18 of a similar cross section and equipped with an outboard stub shaft (not shown) which passes into a third fence/spoiler bearing support 16. The actuator 14 and spoiler rods 17 and 18 are mounted in the upper surface of an extended leading edge 19 which is stiffened in shape by supplementary rib sections 21.

Figure 2:
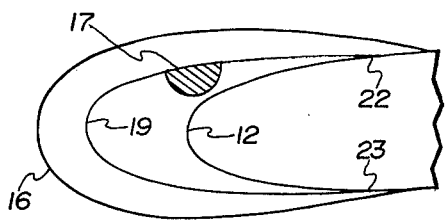
FIG. 2 is a schematic representation of the embodiment of FIG. 1 with the spoiler in an inoperative position.

Referring to FIG. 2, in a normal flight situation, the spoiler rods 17 and 18 are flush with the upper surface of the extended leading edge 19 which has an upper attachment zone 22 and a lower attachment zone 23 where the extended leading edge 19 is permanently connected to the aircraft wing 13, effecting a retrofit of spoiler rods 17 and 18.

Figure 3:
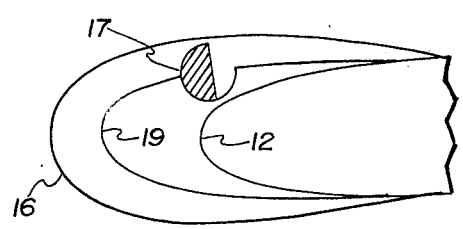
FIG. 3 is a schematic representation of the spoiler in a maximum operative position.

Referring to FIGS. 2 and 3, when the air flow needs to be made turbulent to decrease the lift of the wing to steepen a landing approach, spoiler bars 17 and 18 are rotated to a maximum angle of 90° or with the flat side of spoiler bars 17 and 18 perpendicular to the extended wing surface as shown in FIG. 3.

Referring to FIGS. 4–8, the internal and control structure of the electro-mechanical actuator 14 is shown and will be described. Base plate 24 is shown positioned between an aircraft fuselage wall 26 and the inboard air fence/spoiler bearing support 16. A solenoid bracket 27 supports a rotary solenoid 28 having a rotating armature 29 which is driven through a preselected angle of rotation when the rotary solenoid is electrically energized and which is contiguous with a projecting shaft 31 which projects through a contiguous return spring assembly 32 having a spring case 33 with spring retainer tabs 34. The end of a return spring 36 projects through spring retainer tabs 34 and spirals inward and is attached to the projecting shaft 31 in a direction for turning shaft 31 in a counterlockwise direction whenever it is free to move. Projecting drive shaft 31 is attached to a uni-directional roller clutch. Uni-directional roller clutch 37 receives shaft 31 at one end and contains a plurality of ramp surfaces 39 which are contacted by a plurality of roller bearings 41 which, in turn, are pushed against ramp surfaces 39 by a plurality of retainer springs 42. Retainer springs 42 also bear against spring bosses 43 which are contiguous with an intermediate shaft 44 only when coupling housing 3 rotates in a clockwise direction, pinching rollers 41 between ramp surfaces 39 and intermediate shaft 44. When the rotary solenoid 28 is released, and projecting shaft 41 and coupling housing are rotated counterclockwise by return spring 36, roller bearings 41 escape from the ramp surfaces 39 and do not transfer the reverse rotation. Therefore, intermediate shaft 44 only turns in a clockwise direction. This is further insured because the intermediate shaft 44 also passes through a captive roller clutch 46 which is mounted to base plate 24 by means of a captive clutch bracket 47. Should intermediate shaft 44 be driven by any means in a counterclockwise direction, the plurality of captive rollers 48 will be immediately pinched between the shaft and captive ramp surfaces 49 in captive housing 51 which will prevent such rotation.

Intermediate shaft 44 is attached to an internal rotating magnet of an electric clutch 53 which is coupled to base plate 24 by clutch bracket 54. When internal rotating magnet 52 is energized, it pulls a clutch plate 56 with clutch facing 57 into non-slipping contact with a driving face 58 which is contiguous with the electromagnet 52. A drive shaft 59 is attached to the clutch plate which can be locked to the rotation of intermediate shaft 44 when electric clutch 53 is energized. The drive shaft passes through a return spring bracket 61 and a captive spring assembly 62 which is substantially identical to that shown in FIG. 5, except for the central shaft to which it is attached.

A limiting cam 63 is attached to drive shaft 59 in a position where a cam lobe 64 rests against a stop block 66 attached to base plate 24 when the inboard spoiler bar 17 is flush with the upper surface of the extending leading edge 19 as shown in FIG. 2. The drive shaft 59 extends through a bearing 67 mounted in the air fence/spoiler bearing support 16 and into the spoiler bar 17 where it is held captive by drive pins 68. Control of the electro-mechanical actuator 14 is effected by a multi-contact, makebefore-break switch 69 connected to one side of battery 71, the other side of which is routed to the rotary solenoid 28 and the electrical clutch 53 as a common or ground circuit. Switch arm 69 is in a normally open or "off" position as shown, in contact with the upper open contacts of the switch 69, being spring-biased to this position via spring 72. When switch arms 69A and 69B are depressed to momentarily contact the middle switch contact, the battery is connected to electrical clutch 53 through switch arm 69A and to switch arm 69B. When switch arm 69A and 69B are further depressed to momentarily contact the lower switch contacts, power is coupled through switch arm 69A to electrical clutch 53 and to rotary solenoid 28 through switch arm 69B and switch 73. At this point, rotary solenoid 28 rotates through a pre-determined angle (inherent in its construction), for example 30°, thereby rotating intermediate shaft 31 via uni-directional roller clutch 37 and rotating spoiler rod 17 from the position of FIG. 2 to the position illustrated in FIG. 9. Cam 63, attached to drive shaft 59, is also rotated to the pre-determined stepped angle.

If switch arms 69A and 69B are then returned to the middle position, the rotary solenoid 28 is de-energized and projecting shaft 31 returns in a counterclockwise direction to its original position. Intermediate shaft 44 being restrained by the action of captive roller clutch 46 cannot return to its original position and drive shaft 59, which is locked to intermediate shaft 54 by electric clutch 53, remains at a rotated position.

Figure 9:
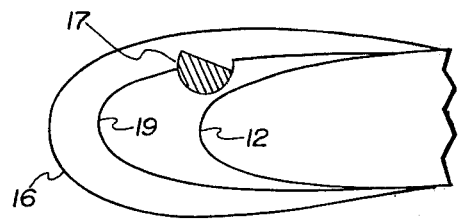
FIG. 9 is a schematic representation of a spoiler after a first step of rotation.
Figure 10:
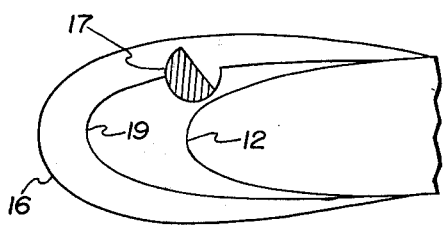
FIG. 10 is a schematic view of a spoiler in an intermediate step of rotation.

If switch 69 is again momentarily moved from the middle switch point to the lower switch point and then back to the middle switch point, another increment of rotation is added to the position of spoiler rod 17, moving it from the position of FIG. 9 to that of FIG. 10. If 30° is the pre-selected increment of rotation of rotary solenoid 28, a third toggle of switch 69 from middle to lower, and back to middle, will bring the spoiler rod 17 to a fully extended position of rotation, moving it from the position shown in FIG. 10 to that shown in FIG. 3. At this fully extended position, limiting cam 63 opens a limiting switch 73 which opens and removes the rotary solenoid 28 from the control circuit. After reaching the fully extended position, additional toggles of switch 69 will not effect further rotation of spoiler rods 17 and 18.

If there is a power failure, or if at any time the operator switch 69 releases it and allows springs 72 to return switch blades 69A and 69B to the upper contacts, power is removed from electrical clutch 53 and the captive spring assembly 62 returns drive shaft 59 to a starting position where the cam 63 is resting against stop block 66 and spoiler rods 17 and 18 are flush with the upper surface of extended leading edge 19.

Although 30° has been utilized to illustrate a typical increment of rotation of rotary solenoid 28, obviously the three steps from closed to fully opened can become four steps by utilizing a 22½ increment, or five steps by using a 18 inches increment, etc.

It should be understood, of course, that the foregoing disclosure relates to only a preferred embodiment of the invention, and that it is intended to cover all changes and modifications of the example of the invention herein chosen, for the purposes of the disclosure, which do not constitute departures from the spirit and scope of the invention.

The invention claimed is:

1. An aircraft spoiler system comprising:
   retro-fit mounting having a geometry of a predetermined aircraft wing leading edge, said retro-fit mounting being fixedly attached to the leading edge of an aircraft wing providing an extension thereof;
   at least one spoiler rod having one substantially flat surface portion, said at least one spoiler rod disposed within said retro-fit mounting and rotatably carried thereby, said spoiler rod having a geometry for being flush with the surface of said retro-fit mounting on one extreme rotative position;
   a control system disposed within said retro-fit mounting for controlling the axial rotative position of said at least one spoiler rod, said control system including a switch operated rotary solenoid having a rotational mechanical output, said rotary solenoid being operable for rotating said mechanical output incrementally when electrically energized, at least one electrically operated clutch coupled to said rotary solenoid output, said at least one electrically operated clutch being mechanically coupled to said at least one spoiler rod; and switch means electrically coupled to said rotary solenoid and said electrically operated clutch for actuation thereof.

2. The aircraft spoiler system of Claim 1 and further including:
   a limit switch electrically coupled between said switch means and said rotary solenoid for disabling said rotary solenoid when said at least one spoiler rod has been rotated in a predetermined number of degrees.

3. An aircraft spoiler system comprising:
   a retro-fit mounting having a geometry of a predetermined aircraft wing leading edge, said retro-fit mounting being fixedly attached to the leading edge of an aircraft wing providing an extension thereof;
   at least one spoiler rod having one substantially flat surface portion, said at least one spoiler rod disposed within said retro-fit mounting and rotatably carried thereby, said spoiler rod having a geometry for being flush with the surface of said retro-fit mounting in one extreme rotative position; and
   a control system disposed within said retro-fit mounting for controlling the axial rotative position of said at least one spoiler rod.

* * * * *